United States Patent
Xie et al.

(10) Patent No.: US 12,212,531 B2
(45) Date of Patent: Jan. 28, 2025

(54) METHOD FOR CONFIGURING CLI MEASUREMENT AND COMMUNICATIONS APPARATUS

(71) Applicant: HUAWEI TECHNOLOGIES CO., LTD., Guangdong (CN)

(72) Inventors: Xi Xie, Beijing (CN); Dongdong Wei, Beijing (CN); Junren Chang, Beijing (CN); Xiangdong Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 307 days.

(21) Appl. No.: 17/737,740

(22) Filed: May 5, 2022

(65) Prior Publication Data
US 2022/0263641 A1 Aug. 18, 2022

Related U.S. Application Data

(63) Continuation of application No. PCT/CN2019/116348, filed on Nov. 7, 2019.

(51) Int. Cl.
*H04L 5/14* (2006.01)
*H04L 5/00* (2006.01)

(52) U.S. Cl.
CPC .......... *H04L 5/1461* (2013.01); *H04L 5/0048* (2013.01); *H04L 5/006* (2013.01)

(58) Field of Classification Search
CPC ..... H04L 5/1461; H04L 5/0048; H04L 5/006; H04L 5/0091; H04L 5/0073; H04W 24/08
See application file for complete search history.

(56) References Cited

U.S. PATENT DOCUMENTS

| | | | |
|---|---|---|---|
| 2019/0223078 A1 | 7/2019 | Sirotkin et al. | |
| 2019/0274155 A1* | 9/2019 | Bhattad | H04L 5/0073 |
| 2020/0112420 A1* | 4/2020 | Xu | H04L 5/0073 |
| 2021/0112503 A1* | 4/2021 | Zhang | H04W 52/243 |
| 2022/0030522 A1* | 1/2022 | Vejlgaard | H04W 52/245 |
| 2022/0116129 A1* | 4/2022 | Ying | H04B 7/0617 |
| 2022/0329462 A1* | 10/2022 | Kang | H04L 5/10 |

FOREIGN PATENT DOCUMENTS

| | | |
|---|---|---|
| CN | 108964856 A | 12/2018 |
| CN | 109219970 A | 1/2019 |
| CN | 109391995 A | 2/2019 |

(Continued)

OTHER PUBLICATIONS

3GPP TS 38.331 V15.7.0 (Sep. 2019), "3rd Generation Partnership Project; Technical Specification Group Radio Access Network; NR; Radio Resource Control (RRC) Protocol Specification (Release 15)," Sep. 2019, 527 pages.

(Continued)

*Primary Examiner* — Chae S Lee
(74) *Attorney, Agent, or Firm* — Fish & Richardson P.C.

(57) ABSTRACT

Example cross-link interference (CLI) measurement configuration methods and apparatus are described. In one example method, a first network device receives, from a second network device, a first message that indicates information about a CLI measurement. The first network device configures the CLI measurement for a terminal device based on the first message.

17 Claims, 8 Drawing Sheets

(56) References Cited

FOREIGN PATENT DOCUMENTS

| CN | 109392005 A | 2/2019 |
|---|---|---|
| CN | 108934188 B | 2/2021 |
| WO | 2018219074 A1 | 12/2018 |
| WO | 2019032031 A1 | 2/2019 |

OTHER PUBLICATIONS

Extended European Search Report issued in European Application No. 19951724.4 on Aug. 18, 2022, 16 pages.
Nokia et al., "UE CLI Measurement Configuration, Reporting, and NW Signaling," 3GPP TSG-RAN2 #107bis, R2-1912408, Chongqing, China, Oct. 14-18, 2019, 10 pages.
PCT International Search Report and Written Opinion issued in International Application No. PCT/CN2019/116348 on Jul. 29, 2020, 15 pages (with English translation).
RAN1, "LS on UE-UE CLI Measurement/Reporting and Network Coordination Mechanism for CLI," 3GPP TSG RAN WG1 Meeting #96, R1-1903677, Athens, Greece, Feb. 25,-Mar. 1, 2019, 4 pages.
LGE, "draft CR on CLI for 38.331," 3GPP TSG-RAN2 Meeting #107bis, R2-1913748, Chongqin, China, Oct. 14-18, 2019, 44 pages.
EP Communication Pursuant to Article 94(3) EPC in European Appln. No. 19951724.4, mailed on Nov. 11, 2024, 11 pages.

\* cited by examiner

METHOD FOR CONFIGURING CLI MEASUREMENT AND COMMUNICATIONS APPARATUS

CROSS-REFERENCE TO RELATED APPLICATIONS

This application is a continuation of International Application No. PCT/CN2019/116348, filed on Nov. 7, 2019, the disclosure of which is hereby incorporated by reference in its entirety.

TECHNICAL FIELD

This application relates to the field of communications technologies, and in particular, to a method for configuring CLI measurement and a communications apparatus.

BACKGROUND

Time division duplex (TDD) is a duplex manner in which uplink transmission and downlink transmission are implemented through time division. In a TDD communication mode, receiving and sending in a communications system are performed at different times of a same frequency. When TDD uplink/downlink patterns (TDD UL/DL pattern) of neighboring cells are different, data sent in a cell may cause interference to data received in another cell. This type of interference is referred to as cross-link interference (CLI).

As shown in FIG. 1, user equipment (UE) 1 is sending uplink (UL) data, and UE 2 is receiving downlink (DL) data. It is assumed that a serving cell of the UE 1 is a cell 1 and corresponds to a serving base station 1, a serving cell of the UE 2 is a cell 2 and corresponds to a serving base station 2, the cell 1 and the cell 2 are two neighboring cells, the UE 1 and the UE 2 are respectively located on an edge of the serving cell of the UE 1 and an edge of the serving cell of the UE 2, and a distance between the UE 1 and the UE 2 is relatively short. From a perspective of UE, when UL data sending of the UE 1 and DL data receiving of the UE 2 are performed at the same time, the UL data sending of the UE 1 may cause CLI to the DL data receiving of the UE 2. From a perspective of a base station, when DL data sending of the base station 2 and UL data receiving of the base station 1 are performed at the same time, the sending of the base station 2 may cause CLI to the receiving of the base station 1.

In conclusion, how to reduce impact of the CLI on communication is a technical problem that needs to be resolved currently.

SUMMARY

This application provides a method for configuring CLI measurement and a communications apparatus, to optimize CLI measurement.

According to a first aspect, this application provides a method for configuring CLI measurement. The method includes: A first network device receives a first message from a second network device. The first network device configures CLI measurement for a terminal device based on the first message. The first message is used to indicate information about the cross-link interference CLI measurement.

The method may be performed by a communications apparatus. The communications apparatus may be the first network device or a module in the first network device, for example, a chip.

Based on this solution, the first network device and the second network device negotiate information about CLI measurement that is separately configured for the terminal device, so that the first network device and the second network device can properly configure the information about the CLI measurement for the terminal device. This helps avoid a case in which when the first network device and the second network device configure CLI measurement for a same terminal device, a limit of CLI measurement that the terminal device needs to perform is exceeded, so that the terminal device can still normally perform the CLI measurement in a scenario in which the terminal device is connected to the first network device and the second network device at the same time.

In this application, there may be the following two cases based on the information about the CLI measurement.

Case 1: The information about the CLI measurement includes a quantity of resources of the CLI measurement.

Based on the case 1, the first message is used to indicate a quantity of resources of the CLI measurement that are configured by the second network device for the terminal device. Alternatively, the first message is used to indicate a maximum quantity of resources that are of the CLI measurement and that the first network device is allowed to configure for the terminal device. Alternatively, the first message is used to indicate a quantity of resources of the CLI measurement that are configured by the second network device for the terminal device in each unit time. Alternatively, the first message is used to indicate a maximum quantity of resources that are of the CLI measurement and that the first network device is allowed to configure for the terminal device in each unit time.

In a possible implementation, the first network device sends a second message to the second network device if determining that the quantity, indicated by using the first message, of resources of the CLI measurement does not meet a first threshold. The second message is used to notify the second network device to adjust the quantity of resources of the CLI measurement that are configured for the terminal device, or is used to notify the second network device to adjust the quantity of resources that are of the CLI measurement and that the first network device is allowed to configure for the terminal device.

The first network device sends the second message to the second network device. This helps avoid a case in which the first network device cannot configure the CLI measurement for the terminal device because the quantity, indicated by using the first message sent by the second network device to the first network device, of resources of the CLI measurement is improper.

Case 2: The information about the CLI measurement includes configuration information of a resource of the CLI measurement.

Based on the case 2, the first message is used to indicate configuration information of a resource that is of the CLI measurement and that the second network device plans to configure for the terminal device.

In a possible implementation, the first network device may determine, based on the first message and configuration information of a resource that is of the CLI measurement and that the first network device plans to configure for the terminal device, a total quantity of resources of the CLI measurement that are configured by the first network device and the second network device for the terminal device. The first network device may adjust the configuration information of the resource that the first network device plans to configure for the terminal device if the total quantity is greater than a second threshold. Herein, the second threshold may be a maximum quantity of resources of the CLI measurement; or may be a maximum quantity, supported by the terminal device, of resources of the CLI measurement; or may be a maximum quantity of resources of the CLI measurement in each unit time; or may be a maximum quantity, supported by the terminal device, of resources of the CLI measurement in each unit time.

The first network device adjusts the configuration information of the resource that is configured by the first network device for the terminal device. This helps avoid a case in which when the two network devices configure, for the terminal device, the configuration information of the resource of the CLI measurement, the limit of the CLI measurement of the terminal device is exceeded.

In this application, the first message may alternatively be used to indicate that the second network device configures the CLI measurement for the terminal device. Alternatively, the first message is used to indicate that the first network device is allowed to configure the CLI measurement for the terminal device. Alternatively, the first message is used to indicate the first network device to configure the CLI measurement for the terminal device. That is, only either of the first network device and the second network device configures the CLI measurement for the terminal device.

Through negotiation between the first network device and the second network device, that only one network device configures the CLI measurement for the terminal device can be implemented. That is, the terminal device receives the CLI measurement configured by the only one network device for the terminal device. In this way, this helps avoid a case in which when the first network device and the second network device configure the CLI measurement for the terminal device, the limit of the CLI measurement that the terminal device needs to perform is exceeded, so that the terminal device can still normally perform the CLI measurement in the scenario in which the terminal device is connected to the first network device and the second network device at the same time.

Further, optionally, the only one network device may configure the CLI measurement for the terminal device within preset duration.

In a possible implementation, the first network device sends a third message to the second network device, and the third message is used to query whether the first network device is allowed to configure the CLI measurement for the terminal device.

When the first network device needs to configure the CLI measurement for the terminal device, the first network device actively sends the third message to the second network device, and there is no need to wait for the second network device to send the first message.

In a possible implementation, the resource includes a sounding reference signal (SRS) resource or a received signal strength indicator (RSSI) resource.

According to a second aspect, this application provides a method for configuring CLI measurement. The method includes: A second network device determines a first message. The second network device sends the first message to a first network device. The first message is used to indicate information about CLI measurement.

The method may be performed by a communications apparatus. The communications apparatus may be the second network device or a module in the second network device, for example, a chip.

For beneficial effects of this solution, refer to the descriptions of the beneficial effects of the first aspect. Details are not described herein again.

In a possible implementation, the information about the CLI measurement includes a quantity of resources of the CLI measurement. Herein, the first message is used to indicate a quantity of resources of the CLI measurement that are configured by the second network device for a terminal device. Alternatively, the first message is used to indicate a maximum quantity of resources that are of the CLI measurement and that the first network device is allowed to configure for the terminal device. Alternatively, the first message is used to indicate a quantity of resources of the CLI measurement that are configured by the second network device for the terminal device in each unit time. Alternatively, the first message is used to indicate a maximum quantity of resources that are of the CLI measurement and that the first network device is allowed to configure for the terminal device in each unit time.

In a possible implementation, the second network device may receive a second message from the first network device, and adjust, based on the second message, the quantity of resources of the CLI measurement that are configured by the second network device for the terminal device; or the second network device adjusts, based on the second message, the quantity of resources that are of the CLI measurement and that the first network device is allowed to configure for the terminal device.

The second network device adjusts the quantity of resources that are of the CLI measurement and that the first network device is allowed to configure for the terminal device, or adjusts the quantity of resources of the CLI measurement that are configured by the second network device for the terminal device. This helps avoid a case in which the first network device cannot configure the CLI measurement for the terminal device because the quantity, indicated by using the first message sent by the second network device to the first network device, of resources of the CLI measurement is improper.

In a possible implementation, the information about the CLI measurement includes configuration information of a resource of the CLI measurement. Herein, the first message is used to indicate configuration information of a resource that is of the CLI measurement and that the second network device plans to configure for the terminal device.

In a possible implementation, the second network device receives a third message from the first network device, and the third message is used to query whether the first network device is allowed to configure the CLI measurement for the terminal device. In this way, the first network device can actively query whether the first network device may configure the CLI measurement for the terminal device.

According to a third aspect, this application provides a method for configuring CLI measurement. The method includes: A first network device sends a fourth message to a second network device. The fourth message is used to notify the second network device that the first network device starts to configure CLI measurement, or is used to notify the second network device that the first network device configures the CLI measurement for a terminal device, or is used to notify the second network device that the second network device is prohibited from configuring the CLI measurement for the terminal device. The first network device configures the CLI measurement for the terminal device. The first network device sends a fifth message to the second network device. The fifth message is used to indicate that the first network device ends the configured CLI measurement.

Based on this solution, the first network device sends the fourth message to the second network device, so that that only one network device configures the CLI measurement for the terminal device can be implemented. In other words, based on this solution, the terminal device receives the CLI measurement configured by the only one network device for the terminal device. In this way, this helps avoid a case in which when the first network device and the second network device configure the CLI measurement for the terminal device, a limit of CLI measurement that the terminal device needs to perform is exceeded, so that the terminal device can still normally perform the CLI measurement in a scenario in which the terminal device is connected to the first network device and the second network device at the same time. Further, in this solution, the CLI measurement does not need to be negotiated between the first network device and the second network device, thereby helping reduce interaction between the first network device and the second network device.

According to a fourth aspect, this application provides a method for configuring CLI measurement. The method includes: A terminal device sends first capability information to a first network device, and sends second capability information to a second network device. The first capability information is determined by the terminal device for the first network device, and the second capability information is determined by the terminal device for the second network device.

Based on this solution, the first network device may configure CLI measurement for the terminal device based on the first capability information. The second network device may configure CLI measurement for the terminal device based on the second capability information. For example, the first network device and the second network device may separately configure a quantity of resources of the CLI measurement for the terminal device, or separately configure configuration information of the CLI measurement for the terminal device.

A sum of the first capability information and the second capability information does not exceed total capability information supported by the terminal device.

In a possible implementation, the first capability information includes a first quantity, determined for the first network device, of resources of the CLI measurement, and the second capability information includes a second quantity, determined for the second network device, of resources of the CLI measurement. A sum of the first quantity and the second quantity is less than or equal to a maximum quantity, supported by the terminal device, of resources of the CLI measurement.

In another possible implementation, the first capability information includes a third quantity, determined for the first network device, of resources of the CLI measurement in each unit time, and the second capability information includes a fourth quantity, determined for the second network device, of resources of the CLI measurement in each unit time. A sum of the third quantity and the fourth quantity is less than or equal to a maximum quantity, supported by the terminal device, of resources of the CLI measurement in each unit time.

In a possible implementation, the resource includes a sounding reference signal SRS resource or a received signal strength indicator RSSI resource.

According to a fifth aspect, this application provides a communications apparatus. The communications apparatus has a function of implementing the first network device in the first aspect, the second network device in the second aspect, the first network device in the third aspect, or the terminal device in the fourth aspect. The function may be implemented by hardware, or may be implemented by hardware by executing corresponding software. The hardware or the software includes one or more units or modules corresponding to the function.

In a possible implementation, the communications apparatus may be a network device, or may be a component that may be used in a network device, for example, a chip, a chip system, or a circuit. In this case, the communications apparatus may include a transceiver and a processor. The processor may be configured to support the communications apparatus in performing a corresponding function of the network device described above. The transceiver is configured to support the communications apparatus in communicating with another network device, a terminal device, and the like. The transceiver may be an independent receiver, an independent transmitter, a transceiver having both a sending function and a receiving function, or an interface circuit. Optionally, the communications apparatus may further include a memory. The memory may be coupled to the processor, and the memory stores a program instruction and data that are necessary for the communications apparatus.

In another possible implementation, the communications apparatus may be a terminal device, or may be a component that may be used in a terminal device, for example, a chip, a chip system, or a circuit. In this case, the communications apparatus may include a transceiver and a processor. Further, the processor may be configured to support the communications apparatus in performing a corresponding function of the terminal device described above. The transceiver is configured to support the communications apparatus in communicating with a network device, another terminal device, and the like. The transceiver may be an independent receiver, an independent transmitter, a transceiver having both a sending function and a receiving function, or an interface circuit. Optionally, the communications apparatus may further include a memory. The memory may be coupled to the processor, and the memory stores a program instruction and data that are necessary for the communications apparatus.

According to a sixth aspect, this application provides a communications apparatus, configured to implement the method in any one of the first aspect or the possible implementations of the first aspect, or configured to implement the method in any one of the second aspect or the possible implementations of the second aspect, or configured to implement the method in any one of the third aspect or the possible implementations of the third aspect, or configured to implement the method in any one of the fourth aspect or the possible implementations of the fourth aspect. The communications apparatus includes corresponding function modules, respectively configured to implement steps in the foregoing methods. A function may be implemented by hardware, or may be implemented by hardware by executing corresponding software. The hardware or software includes one or more modules corresponding to the function.

In a possible implementation, the communications apparatus may be a network device, and the communications apparatus may include a processing unit and a transceiver unit. These units may perform corresponding functions of the first network device or the second network device in the foregoing method examples. For details, refer to the detailed descriptions in the method examples. Details are not described herein again.

In another possible implementation, the communications apparatus may be a terminal device, and the communications apparatus may include a processing unit and a transceiver unit. These units may perform corresponding functions of the terminal device in the foregoing method examples. For details, refer to the detailed descriptions in the method examples. Details are not described herein again.

According to a seventh aspect, this application provides a communications system. The communications system includes a terminal device, a first network device, and a second network device. The first network device may be configured to perform the method in any one of the first aspect or the possible implementations of the first aspect, and the second network device is configured to perform the method in any one of the second aspect or the possible implementations of the second aspect.

According to an eighth aspect, this application provides a computer-readable storage medium. The computer-readable storage medium stores a computer program or an instruction, and when the computer program or the instruction is executed by a communications apparatus, the communications apparatus is enabled to perform the method in any one of the first aspect or the possible implementations of the first aspect, or the communications apparatus is enabled to perform the method in any one of the second aspect or the possible implementations of the second aspect, or the communications apparatus is enabled to perform the method in any one of the third aspect or the possible implementations of the third aspect, or the communications apparatus is enabled to perform the method in any one of the fourth aspect or the possible implementations of the fourth aspect.

According to a ninth aspect, this application provides a computer program product. The computer program product includes a computer program or an instruction, and when the computer program or the instruction is executed by a communications apparatus, the method in any one of the first aspect or the possible implementations of the first aspect is implemented, or the method in any one of the second aspect or the possible implementations of the second aspect is implemented, or the communications apparatus is enabled to perform the method in any one of the third aspect or the possible implementations of the third aspect, or the communications apparatus is enabled to perform the method in any one of the fourth aspect or the possible implementations of the fourth aspect.

DESCRIPTION OF EMBODIMENTS

The following describes in detail this application with reference to the accompanying drawings.

Figure 1:
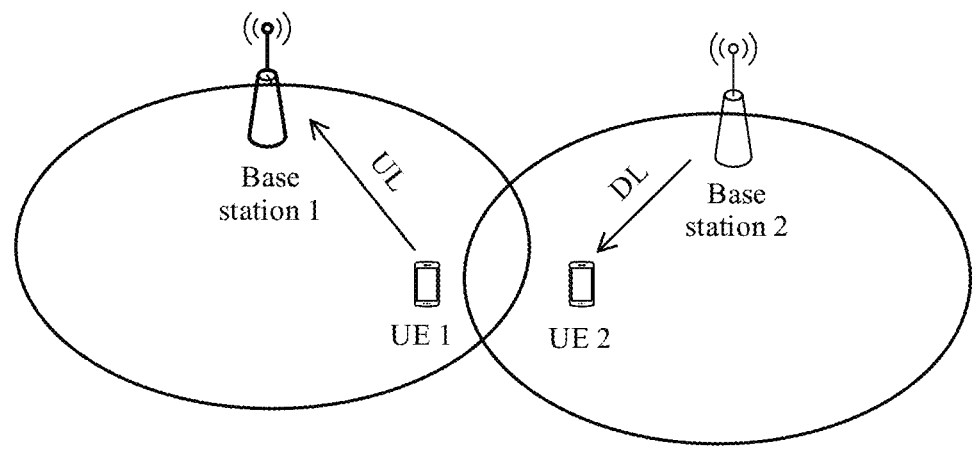
FIG. 1 is a schematic diagram of a network architecture in which CLI interference may be caused in the current technology.
Figure 2:
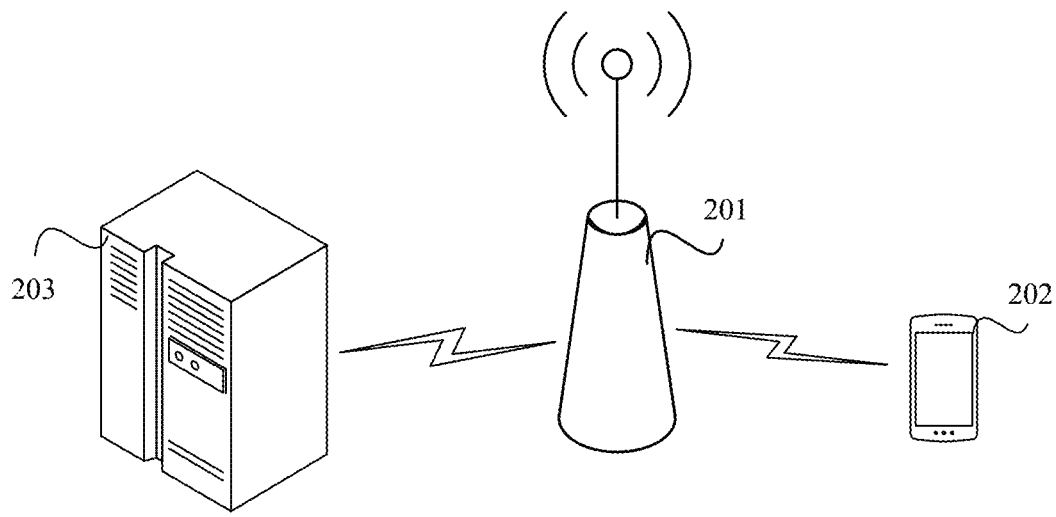
FIG. 2 is a schematic architectural diagram of a communications system according to this application.

FIG. 2 is a schematic architectural diagram of a communications system to which this application is applicable. As shown in FIG. 2, the communications system may include a network device 201, a terminal device 202, and a core network device 203. The terminal device 202 communicates with the network device 201 in a wireless manner, the network device 201 communicates with the core network device 201 in a wireless or wired manner, and terminal devices 202 communicate with each other in a wireless manner, for example, communicate with each other through a sidelink (SL) air interface. The core network device 203 and the network device 201 may be different physical devices independent of each other, or functions of the core network device 201 and logical functions of the network device 201 may be integrated into a same physical device, or a part of functions of the core network device 203 and a part of functions of the network device 201 may be integrated into one physical device. The terminal device 202 may be at a fixed location, or may be mobile. FIG. 2 is only a schematic diagram. The communications system may further include another network device, for example, may further include a wireless relay device and a wireless backhaul device, which are not shown in FIG. 2. Quantities of core network devices, network devices, and terminal devices included in the communications system are not limited in this application.

The network device is an access device used by the terminal device to access the communications system in a wireless manner, and may be a base station, an evolved NodeB (eNodeB), a transmission reception point (TRP), a next generation NodeB (gNB) in a 5G communications system, a base station in a future communications system, an access node in a wireless fidelity (WiFi) system, or the like; or may be a module or a unit that completes a part of functions of the base station, for example, may be a central unit (CU), or may be a distributed unit (DU). A specific technology and a specific device form that are used by the network device are not limited in embodiments of this application.

The terminal device may also be referred to as a terminal, user equipment (UE), a mobile station, a mobile terminal, or the like. The terminal device may be a mobile phone, a tablet computer, a computer having a wireless transceiver function, a virtual reality terminal device, an augmented reality terminal device, a wireless terminal in industrial control, a wireless terminal in self driving, a wireless terminal in remote surgery, a wireless terminal in a smart grid, a wireless terminal in transportation safety, a wireless terminal in a smart city, a wireless terminal in a smart home, or the like. A specific technology and a specific device form that are used by the terminal device are not limited in this application.

The network device and the terminal device may be deployed on land, including an indoor or outdoor device, a handheld device, or a vehicle-mounted device; may be deployed on a water surface; or may be deployed on aircraft, balloons, and artificial satellites in the air. Application scenarios of the network device and the terminal device are not limited in this application.

The network device and the terminal device may communicate with each other by using a licensed spectrum, or may communicate with each other by using an unlicensed spectrum, or may communicate with each other by using both a licensed spectrum and an unlicensed spectrum. The network device and the terminal device may communicate with each other by using a sub-6 gigahertz (GHz) spectrum, or may communicate with each other by using a spectrum above 6 GHz, or may communicate with each other by using both a sub-6 GHz spectrum and a spectrum above 6 GHz. A spectrum resource used between the network device and the terminal device is not limited in this application.

Figure 3:
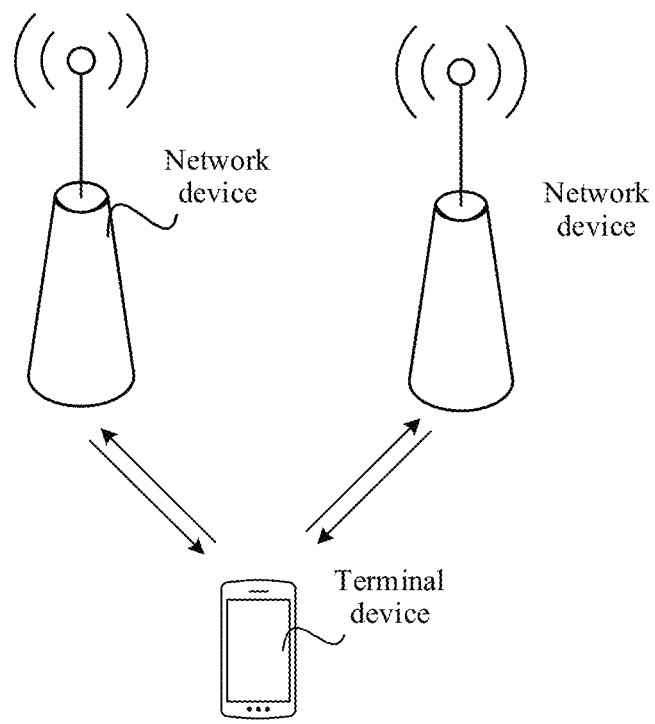
FIG. 3 is a schematic architectural diagram of a communications system in an application scenario according to this application.

Based on the architecture of the communications system shown in FIG. 2, the following describes a possible application scenario provided in this application, namely, a multi-radio dual connectivity (MR-DC) application scenario. MR-DC means that a multi-transmit antenna/multi-receive antenna terminal device uses, at the same time, resources (for example, time-frequency resources) provided by two nodes (for example, network devices). In other words, one terminal device is connected to two nodes (for example, network devices) at the same time. Referring to FIG. 3, one node is used as a master node (MN), the other node is used as a secondary node (SN), and the MN is connected to the SN through a network interface.

Based on an MN type, an SN type, and different core networks connected to the MN, the MR-DC may be classified into the following four types:

Type 1: evolved universal terrestrial radio access network and NR dual connectivity (E-UTRA-NR dual connectivity, EN-DC) (which is also referred to as E-UTRA-NR DC).

Figure 4A:
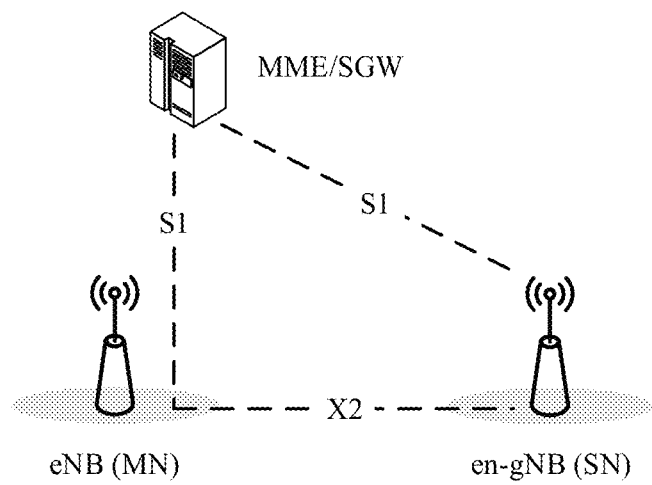
FIG. 4a is a schematic diagram of an E-UTRA-NR dual connectivity (EN-DC) architecture according to this application.

FIG. 4a is a schematic diagram of an EN-DC architecture according to this application. In this architecture, a master node may be a long term evolution (LTE) eNB, and a secondary node is a new radio (NR) en-gNB. The LTE eNB and the NR en-gNB may be connected to a mobility management network element (MME) or a serving gateway (SGW) in a 4th generation mobile communication technology (4G) core network through an Si interface, and the LTE eNB and the en-gNB may be connected through an X2 interface.

Type 2: next generation-radio access network evolved universal terrestrial radio access network and NR dual connectivity (next generation-radio access network E-UTRA-NR dual connectivity, NGEN-DC).

Figure 4B:
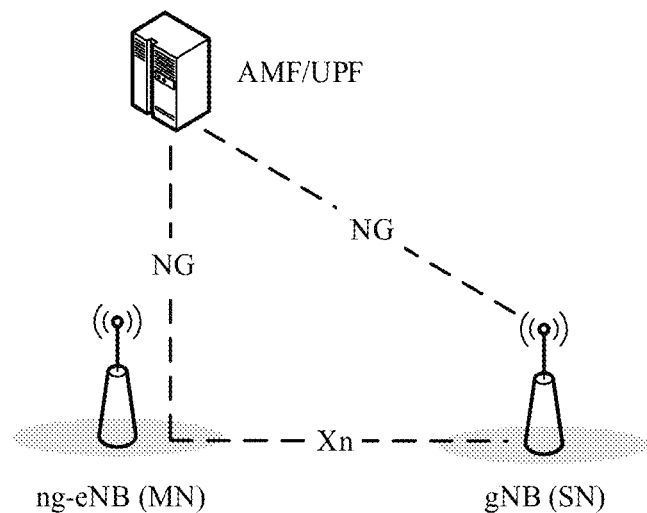
FIG. 4b is a schematic diagram of an NGEN-DC architecture according to this application.

FIG. 4b is a schematic diagram of an NGEN-DC architecture according to this application. In this architecture, a master node is an ng-eNB, a secondary node is an NR gNB, and the ng-eNB may also be referred to as an anchor base station. The ng-eNB and the NR gNB are connected to an access and mobility management function (AMF) network element or a user plane function (UPF) network element in a 5th generation (5G) core network through an NG interface, and the NR gNB and the ng-eNB may be connected through an Xn interface.

Type 3: NE-DC (which is also referred to as NR-E-UTRA DC).

Figure 4C:
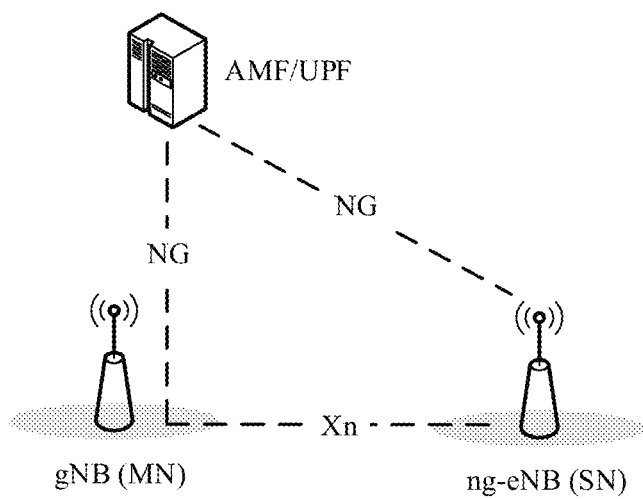
FIG. 4c is a schematic diagram of an NE-DC architecture according to this application.

FIG. 4c is a schematic diagram of an NE-DC architecture according to this application. In this architecture, a master node is an NR gNB, and a secondary node is an ng-eNB. The NR gNB and the ng-eNB are connected to an AMF network element or a UPF network element in a 5G core network through an NG interface, and the NR gNB and the ng-eNB may be connected through an Xn interface.

Type 4: NR-DC (which is also referred to as NR-NR DC).

Figure 4D:
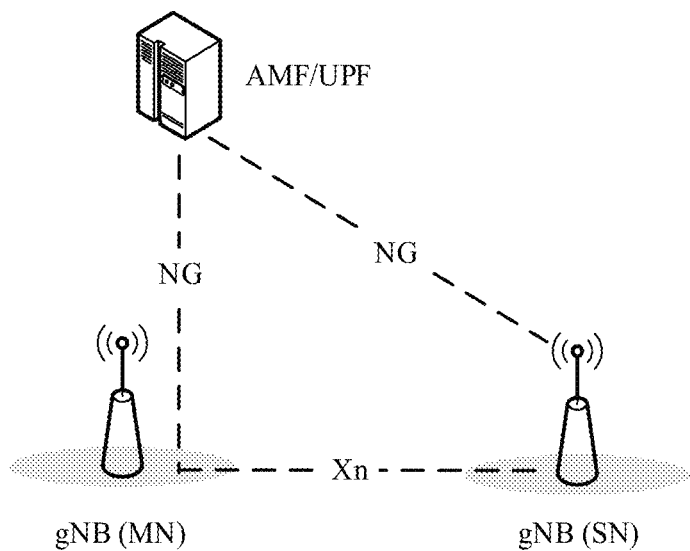
FIG. 4d is a schematic diagram of an NR-DC architecture according to this application.

FIG. 4d is a schematic diagram of an NR-DC architecture according to this application. In this architecture, a master node is an NR gNB, and a secondary node is an NR gNB. The NR gNBs are connected to an AMF network element or a UPF network element in a 5G core network through an NG interface, and the NR gNBs may be connected through an Xn interface.

It should be noted that network architectures and application scenarios described in this application are intended to describe the technical solutions in this application more clearly, but are not intended to limit the technical solutions provided in this application. A person of ordinary skill in the art may know that as the network architectures evolve and a new service scenario emerges, the technical solutions provided in this application are also applicable to a similar technical problem.

In the following, some terms in this application are described to help a person skilled in the art have a better understanding.

1. Reference Signal Received Power (RSRP)

The RSRP is a power value of a reference signal received in a unit time (for example, a symbol) on all resource elements (RE) that carry the reference signal.

2. Received Signal Strength Indicator (RSSI)

The RSSI is a total power value of received signals, including both a power value of a wanted signal or a reference signal and a power value of interference, thermal noise, and the like.

3. Cross-Link Interference

When TDD uplink/downlink patterns (TDD UL/DL pattern) of neighboring cells are different, data sent in a cell may cause interference to data received in another cell. This type of interference is referred to as cross-link interference (CLI).

4. Cross-Link Interference Measurement (CLI Measurement)

A network device configures CLI measurement for a terminal device. The terminal device measures a configured reference signal (for example, an interference source), and then reports a CLI measurement result (for example, an interference strength) to the network device. The network device may coordinate scheduling based on the CLI measurement result reported by the terminal device, to avoid or reduce the CLI as much as possible.

5. CLI Measurement Type

The CLI measurement may be classified into the following two types based on different types of reference signals (namely, resources) of the CLI measurement. (1) CLI sounding reference signal reference signal received power (SRS-RSRP) measurement: In this type of CLI measurement, a reference signal is an SRS resource. The terminal device measures an SRS resource sent by one or more terminal devices (namely, aggressor terminal devices) that cause interference, to obtain an RSRP result of each SRS resource. That is, the terminal device may separately obtain an interference strength of each interference source through measurement. (2) CLI RSSI measurement: In this type of CLI measurement, a reference signal is an RSSI resource. The terminal device measures a total received power value on a configured RSSI resource. The network device determines, by using the total received power value obtained through the measurement of the terminal device, an overall interference status of the terminal device.

To ensure that the CLI measurement does not bring relatively heavy burden to the terminal device, some limitations are defined for the CLI measurement, which may be classified into the following two aspects: (a) A total quantity of resources of the CLI measurement that need to be performed by the terminal device. For example, a total quantity of CLI SRS resources that need to be measured by the terminal device is 32. That is, a maximum quantity of CLI SRS resources that need to be measured by the terminal device is 32. For another example, a total quantity of CLI RSSI resources that need to be measured by the terminal device is 64. That is, a maximum quantity of CLI RSSI resources that need to be measured by the terminal device is 64. (b) A quantity of resources of the CLI measurement that need to be performed by the terminal device in one slot. For example, a maximum quantity of CLI SRS resources that need to be measured by the terminal device in one slot is 8.

With reference to the foregoing MR-DC scenario, one terminal device is connected to two network devices at the same time. That is, one terminal device is connected to the MN and the SN. When both the MN and the SN configure CLI measurement for the terminal device, the CLI measurement configured by the MN and the SN for the terminal device may exceed a specified limit of the CLI measurement. For example, a total quantity of SRS resources that need to be measured by the terminal device is 32, CLI measurement configured by the MN for the terminal device includes 20 SRS resources, the SN also configures CLI measurement for the terminal device, and the configured CLI measurement includes 15 SRS resources. In this case, the terminal device receives a quantity of resources configured by the SN and a quantity of resources configured by the MN, and a sum of the quantities is 15+20=35, which exceeds the total quantity 32 of SRS resources that need to be measured by the terminal device. Consequently, the terminal device cannot normally perform the CLI measurement.

In view of this, a method for configuring CLI measurement provided in this application is proposed. In the following description, the method for configuring CLI measurement may be used in the network architecture shown in any one of the accompanying drawings FIG. 2 to FIG. 4d. In a possible case, a first network device may be the MN in FIG. 3, and a second network device is the SN in FIG. 3. In this case, the first network device may be the LTE eNB in FIG. 4a, and the second network device may be the NR gNB in FIG. 4a. Alternatively, the first network device may be the ng-eNB in FIG. 4b, and the second network device may be the NR gNB in FIG. 4b. Alternatively, the first network device is the NR gNB in FIG. 4c, and the second network device is the ng-eNB in FIG. 4c. Alternatively, the first network device is the NR gNB in FIG. 4d, and the second network device is the other NR gNB in FIG. 4d. In another possible case, a first network device may be the SN in FIG. 3, and a second network device is the MN in FIG. 3. In this case, the first network device may be the NR gNB in FIG. 4a, and the second network device may be the LTE eNB in FIG. 4a. Alternatively, the first network device may be the NR gNB in FIG. 4b, and the second network device may be the ng-eNB in FIG. 4b. Alternatively, the first network device is the ng-eNB in FIG. 4c, and the second network device is the NR gNB in FIG. 4c. Alternatively, the first network device is the NR gNB in FIG. 4d, and the second network device is the other NR gNB in FIG. 4d. The terminal device may be the terminal device 202 shown in FIG. 2, or may be the terminal device shown in FIG. 3.

Figure 5:
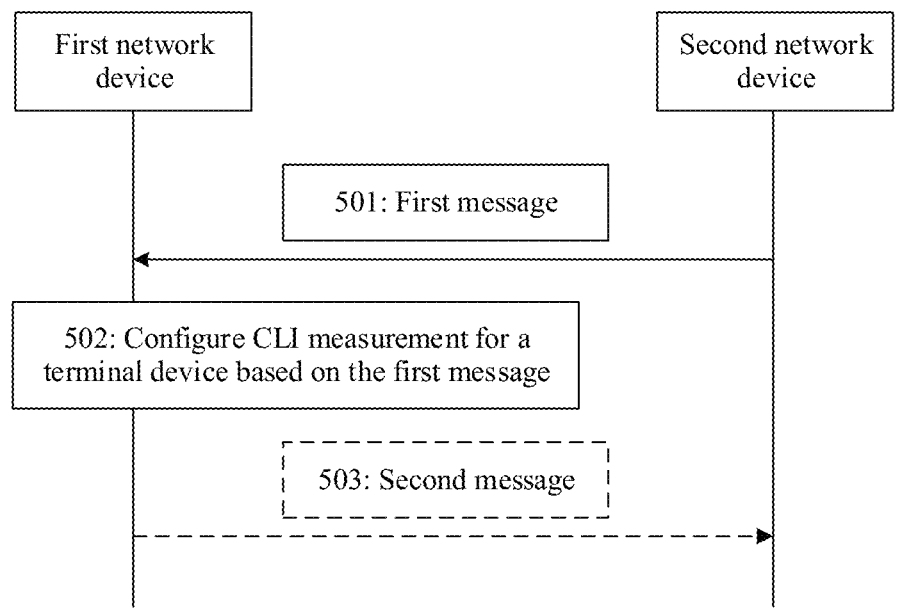
FIG. 5 is a schematic flowchart of a method for configuring CLI measurement according to this application.

FIG. 5 is a schematic flowchart of a method for configuring CLI measurement according to this application. The method includes the following steps.

Step 501: A second network device sends a first message to a first network device, where the first message is used to indicate information about CLI measurement.

Correspondingly, the first network device receives the first message from the second network device.

In this application, the information about the CLI measurement may include a quantity of resources of the CLI measurement or configuration information of a resource for the CLI measurement. An example in which the information about the CLI measurement is a quantity of resources of the CLI measurement or the information about the CLI measurement is configuration information of the CLI measurement is used below for description.

Case 1: The information about the CLI measurement includes a quantity of resources of the CLI measurement.

Herein, the resource of the CLI measurement includes a time-frequency resource. The resource of the CLI measurement is, for example, a CLI SRS resource or a CLI-RSSI resource.

The first message may be used to indicate a quantity of resources of the CLI measurement that are configured by the second network device for a terminal device. In other words, the second network device may notify the first network device of the quantity of resources of the CLI measurement that are configured by the second network device for the terminal device.

Alternatively, the first message may be used to indicate a maximum quantity of resources that are of the CLI measurement and that the first network device is allowed to configure for the terminal device. In other words, the second network device may notify the first network device of the maximum quantity of resources that are of the CLI measurement and that the first network device is allowed to configure for the terminal device.

Alternatively, the first message may be used to indicate a quantity of resources of the CLI measurement that are configured by the second network device for the terminal device in a unit time. In other words, the second network device may notify the first network device of the quantity of resources of the CLI measurement that are configured by the second network device for the terminal device in each unit time. The unit time may be a slot, a symbol, a subframe, a half-frame, a frame, or the like.

Alternatively, the first message may be used to indicate a maximum quantity of resources that are of the CLI measurement and that the first network device is allowed to configure for the terminal device in a unit time. In other words, the second network device may notify the first network device of the maximum quantity of resources that are of the CLI measurement and that the first network device is allowed to configure for the terminal device in each unit time. The unit time may be a slot.

Case 2: The information about the CLI measurement includes configuration information (information element, IE) of a resource of the CLI measurement.

For example, the configuration information of the resource of the CLI measurement includes time domain configuration information of the resource, frequency domain configuration information of the resource, a periodicity of the resource, an identifier of the resource, and the like.

Herein, the first message is used to indicate configuration information of a resource that is of the CLI measurement and that the second network device plans to configure for the terminal device.

In a possible implementation, a type of the first message sent by the second network device to the first network device may be an X2/Xn message. Further, optionally, when the second network device is an MN, and the first network device is an SN, the X2/Xn message may be a CG-Config-Info message; or when the second network device is an SN, and the first network device is an MN, the X2/Xn message may be a CG-Config message.

Step 502: The first network device may configure the CLI measurement for the terminal device based on the first message.

In a possible implementation, after the first network device receives the first message, the first network device may send a second message to the second network device (refer to step 503 in FIG. 5) if determining that the quantity, indicated by using the first message, of resources of the CLI measurement does not meet a first threshold. The second message is used to notify the second network device to adjust the quantity of resources of the CLI measurement that are configured for the terminal device, or the second message is used to notify the second network device to adjust the quantity of resources that are of the CLI measurement and that the first network device is allowed to configure for the terminal device.

Herein, the following four cases are described in detail based on content indicated by using the first message.

Case A: The first message is used to indicate a quantity of resources of the CLI measurement that are configured by the second network device for the terminal device.

In a possible implementation, the first network device may configure a quantity of resources of the CLI measurement for the terminal device based on the first message and a total quantity of resources of the CLI measurement that need to be performed by the terminal device. For example, the first message is used to indicate that a quantity of CLI SRS resources configured by the second network device for the terminal device is 10. The first network device may determine, based on the first message and a total quantity 32 of CLI SRS resources that need to be measured by the terminal device, that a quantity of CLI SRS resources configured for the terminal device is 32−10=22. The first network device may configure less than or equal to 22 CLI SRS resources for the terminal device. For another example, the first message is used to indicate that a quantity of CLI RSSI resources configured by the second network device for the terminal device is 15. The first network device may determine, based on the first message and a total quantity 64 of CLI RSSI resources that need to be measured by the terminal device, that a quantity of CLI RSSI resources configured for the terminal device is 64−15=49. The first network device may configure less than or equal to 49 CLI RSSI resources for the terminal device.

Based on the case A, if it is determined that the quantity, indicated by using the first message, of resources is greater than the first threshold, it indicates that the quantity of resources of the CLI measurement that are configured by the second network device for the terminal device is relatively large. It is possible that the first network device cannot normally configure the resource of the CLI measurement for the terminal device. The first network device may send the second message to the second network device, and the second message is used to notify the second network device to adjust the quantity of resources of the CLI measurement that are configured for the terminal device. In a possible implementation, after receiving the second message, the second network device adjusts the quantity of resources of the CLI measurement that are configured by the second network device for the terminal device. Further, optionally, after adjusting the quantity of resources of the CLI measurement that are configured for the terminal device, the second network device may resend the first message to the first network device. In this case, the quantity, indicated by using the first message, of resources of the CLI measurement that are configured by the second network device for the terminal device is a quantity adjusted by the second network device.

Case B: The first message is used to indicate a maximum quantity of resources that are of the CLI measurement and that the first network device is allowed to configure for the terminal device.

In a possible implementation, the first network device may determine, based on the first message, a maximum quantity of resources of the CLI measurement that are configured for the terminal device. For example, the first message is used to indicate that a quantity of CLI SRS resources that the first network device is allowed to configure for the terminal device is 10, and a quantity of CLI SRS resources that the first network device may configure for the terminal device is less than or equal to 10. For another example, the first message is used to indicate that a quantity of CLI RSSI resources that the first network device is allowed to configure for the terminal device is 15, and a quantity of CLI RSSI resources that the first network device may configure for the terminal device is less than or equal to 15.

Based on the case B, if it is determined that the quantity, indicated by using the first message, of resources of the CLI measurement is less than the first threshold, it indicates that the quantity of resources that are of the CLI measurement and that the first network device is allowed to configure is relatively small. It is possible that the first network device cannot normally configure the resource of the CLI measurement for the terminal device. The first network device sends the second message to the second network device, and the second message is used to notify the second network device to adjust the maximum quantity of resources that are of the CLI measurement and that the first network device is allowed to configure for the terminal device. In a possible implementation, the second network device may adjust, based on the second message, the maximum quantity of resources that are of the CLI measurement and that the first network device is allowed to configure for the terminal device. Further, optionally, after adjusting the maximum quantity of resources that are of the CLI measurement and that the first network device is allowed to configure for the terminal device, the second network device may resend the first message to the first network device. In this case, the maximum quantity, indicated by using the first message, of resources that are of the CLI measurement and that the first network device is allowed to configure for the terminal device is a quantity adjusted by the second network device.

Case C: The first message may be used to indicate a quantity of resources of the CLI measurement that are configured by the second network device for the terminal device in each unit time. In the case C, an example in which a unit time is one slot is used for description.

In a possible implementation, the first network device may configure, based on the first message and a maximum quantity of resources of the CLI measurement that need to be performed by the terminal device in one slot, a quantity of resources of the CLI measurement for the terminal device. For example, the first message is used to indicate that a quantity of CLI SRS resources configured by the second network device for the terminal device in one slot is 6. The first network device may configure, based on the first message and a maximum quantity 8 of CLI SRS resources that need to be measured by the terminal device in one slot, less than or equal to 8−6=2 CLI SRS resources for the terminal device in one slot.

Based on the case C, if it is determined that the quantity, indicated by using the first message, of resources is greater than a third threshold, it indicates that the quantity of resources of the CLI measurement that are configured by the second network device for the terminal device in each unit time is relatively large. It is possible that the first network device cannot normally configure the resource of the CLI measurement for the terminal device. The first network device may send the second message to the second network device, and the second message is used to notify the second network device to adjust the quantity of resources of the CLI measurement that are configured for the terminal device in each unit time. In a possible implementation, after receiving the second message, the second network device adjusts the quantity of resources of the CLI measurement that are configured by the second network device for the terminal device in each unit time. Further, optionally, after adjusting the quantity of resources of the CLI measurement that are configured for the terminal device in each unit time, the second network device may resend the first message to the first network device. In this case, the quantity, indicated by using the first message, of resources of the CLI measurement that are configured by the second network device for the terminal device in each unit time is a quantity adjusted by the second network device.

Case D: The first message may be used to indicate a maximum quantity of resources that are of the CLI measurement and that the first network device is allowed to configure for the terminal device in each unit time. In the case D, an example in which a unit time is one slot is used for description.

In a possible implementation, the first network device may configure, based on the first message and a maximum quantity of resources of the CLI measurement that need to be performed by the terminal device in one slot, a quantity of resources of the CLI measurement for the terminal device. For example, the first message is used to indicate that a quantity of CLI SRS resources that the first network device is allowed to configure for the terminal device in one slot is 6, and the first network device determines that less than or equal to 6 CLI SRS resources may be configured for the terminal device in one slot.

Based on the case D, if it is determined that the quantity, indicated by using the first message, of resources of the CLI measurement is less than a fourth threshold, it indicates that the quantity of resources that are of the CLI measurement and that the first network device is allowed to configure in each unit time is relatively small. It is possible that the first network device cannot normally configure the resource of the CLI measurement for the terminal device. The first network device sends the second message to the second network device, and the second message is used to notify the second network device to adjust the maximum quantity of resources that are of the CLI measurement and that the first network device is allowed to configure for the terminal device in each unit time. In a possible implementation, the second network device may adjust, based on the second message, the maximum quantity of resources that are of the CLI measurement and that the first network device is allowed to configure for the terminal device in each unit time. Further, optionally, after adjusting the maximum quantity of resources that are of the CLI measurement and that the first network device is allowed to configure for the terminal device in each unit time, the second network device may resend the first message to the first network device. In this case, the maximum quantity, indicated by using the first message, of resources that are of the CLI measurement and that the first network device is allowed to configure for the terminal device in each unit time is a quantity adjusted by the second network device.

Based on the case 2, after receiving the first message, the first network device determines, based on the configuration information of the resource that is of the CLI measurement and that the second network device plans to configure for the terminal device, a quantity of resources that are of the CLI measurement and that the second network device plans to configure for the terminal device. Then, the first network device determines a sum of a quantity of resources that are of the CLI measurement and that the first network device plans to configure for the terminal device and the quantity of resources that are of the CLI measurement and that the second network device plans to configure for the terminal device. The first network device needs, if the sum is greater than a second threshold, to adjust configuration information of a resource that is of the CLI measurement and that the first network device plans to configure for the terminal device. The second threshold may be a maximum quantity of resources of the CLI measurement. For example, a total quantity of CLI SRS resources that need to be measured by the terminal device is 32. For another example, a total quantity of CLI RSSI resources that need to be measured by the terminal device is 64. Alternatively, the second threshold may be a maximum quantity of resources of the CLI measurement in a unit time. For example, a maximum quantity of CLI SRS resources that need to be measured by the terminal device in one slot is 8. Alternatively, the second threshold may be a maximum quantity, supported by the terminal device, of resources of the CLI measurement. Alternatively, the second threshold may be a maximum quantity, supported by the terminal device, of resources of the CLI measurement in a unit time.

It can be learned from step 501 and step 502 that the first network device and the second network device negotiate information about CLI measurement that is separately configured for the terminal device, so that the first network device and the second network device can properly configure the information about the CLI measurement for the terminal device. This helps avoid a case in which when the first network device and the second network device configure the CLI measurement for the terminal device, a limit of CLI measurement that the terminal device needs to perform is exceeded, so that the terminal device can still normally perform the CLI measurement in a scenario in which the terminal device is connected to the first network device and the second network device at the same time.

Figure 6:
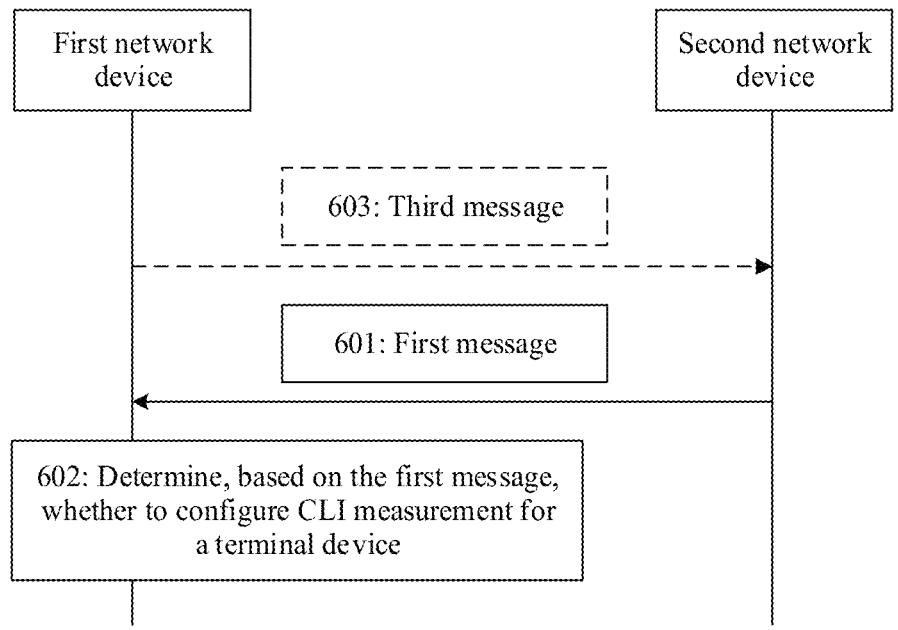
FIG. 6 is a schematic flowchart of another method for configuring CLI measurement according to this application.

In this application, when one terminal device is connected to two network devices, the two network devices may negotiate with each other, so that only one network device configures CLI measurement for the terminal device. FIG. 6 is a schematic flowchart of another method for configuring CLI measurement according to this application. The method includes the following steps.

Step 601: A second network device sends a first message to a first network device. Correspondingly, the first network device receives the first message from the second network device.

Herein, the first message is used to indicate that the second network device configures CLI measurement for a terminal device. In other words, the first message is used to indicate that the second network device configures the CLI measurement for the terminal device and that the first network device cannot configure the CLI measurement for the terminal device.

Alternatively, the first message is used to indicate that the first network device is allowed to configure CLI measurement for the terminal device. It may also be understood as that the first message is used to indicate that the first network device is allowed to configure the CLI measurement for the terminal device and that the second network device is not allowed to configure the CLI measurement for the terminal device.

Alternatively, the first message is used to indicate the first network device to configure CLI measurement for the terminal device. In other words, the first message is used to indicate the first network device to configure the CLI measurement for the terminal device and indicate that the second network device does not configure the CLI measurement for the terminal device.

Step 602: The first network device determines, based on the first message, whether to configure the CLI measurement for the terminal device.

Herein, there may be the following three cases based on content indicated by using the first message.

Case 1: The first message is used to indicate that the second network device configures CLI measurement for the terminal device.

Based on the case 1, the first network device may determine, based on the first message, that the second network device configures the CLI measurement for the terminal device, and the first network device determines that the first network device cannot configure the CLI measurement for the terminal device.

Case 2: The first message is used to indicate that the first network device is allowed to configure CLI measurement for the terminal device.

Based on the case 2, the first network device may determine, based on the first message, that the first network device is allowed to configure the CLI measurement for the terminal device. In the case 2, the first network device may configure the CLI measurement for the terminal device, or may not configure the CLI measurement for the terminal device. In other words, in the case 2, whether the first network device configures the CLI measurement for the terminal device may be autonomously determined by the first network device.

Case 3: The first message is used to indicate the first network device to configure CLI measurement for the terminal device.

In other words, the second network device may directly indicate the first network device to configure the CLI measurement for the terminal device, that is, indicate that the first network device needs to configure the CLI measurement for the terminal device.

Further, optionally, the first message may further indicate that only one network device configures the CLI measurement for the terminal device within preset duration. In other words, the first message may indicate that the first network device or the second network device configures the CLI measurement for the terminal device within the preset duration.

In this application, the first network device may alternatively actively send a third message to the second network device (refer to step 603 in FIG. 6), and the third message is used to query whether the first network device is allowed to configure the CLI measurement for the terminal device. After receiving the third message, the second network device sends the first message to the first network device, to notify the first network device whether the first network device is allowed to configure the CLI measurement for the terminal device. When the first network device needs to configure the CLI measurement for the terminal device, the first network device actively sends the third message to the second network device, and there is no need to wait for the second network device to send the first message.

It should be noted that, configuring the CLI measurement for the terminal device includes configuring, for the terminal device, configuration information of a measurement object of the CLI measurement (for example, configuration information of a resource of the CLI measurement), reporting configuration information of the CLI measurement, and configuration information (namely, filtering configuration) of a measurement quantity for the CLI measurement.

It can be learned from step 601 and step 602 that, through negotiation between the first network device and the second network device, that only one network device configures the CLI measurement for the terminal device can be implemented. In other words, based on this solution, the terminal device receives the CLI measurement configured by the only one network device for the terminal device. In this way, this helps avoid a case in which when the first network device and the second network device configure the CLI measurement for the terminal device, a limit of CLI measurement that the terminal device needs to perform is exceeded, so that the terminal device can still normally perform the CLI measurement in a scenario in which the terminal device is connected to the first network device and the second network device at the same time.

It should be noted that, after the terminal device changes from being served by only one network device (the second network device) to being served by two network devices (the first network device and the second network device), the second network device in FIG. 6 may be used as an MN, and the first network device may be used as an SN.

Figure 7:
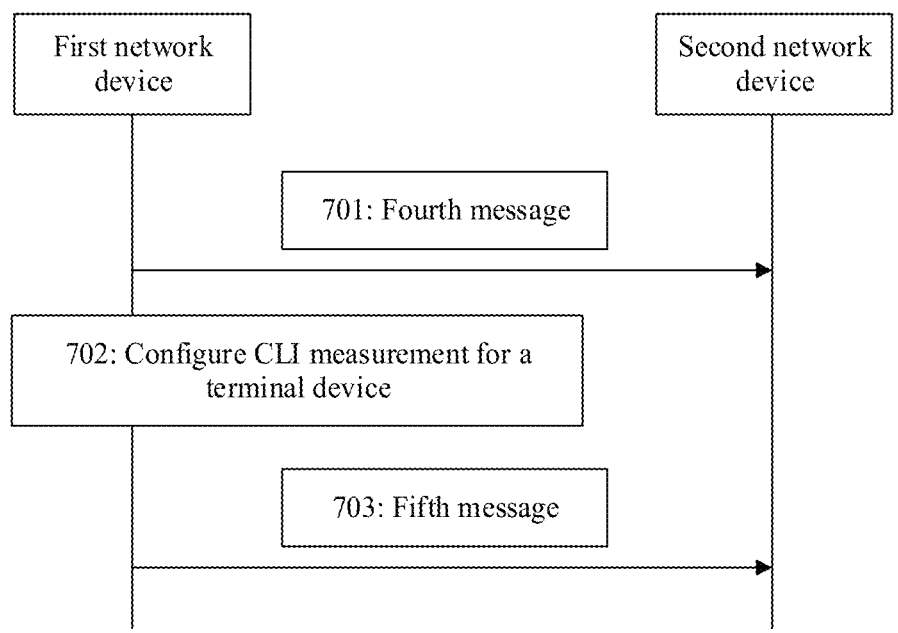
FIG. 7 is a schematic flowchart of still another method for configuring CLI measurement according to this application.

FIG. 7 is a schematic flowchart of still another method for configuring CLI measurement according to this application. The method includes the following steps.

Step 701: A first network device sends a fourth message to a second network device. Correspondingly, the second network device receives the fourth message from the first network device.

Herein, the fourth message is used to notify the second network device that the first network device starts to configure CLI measurement. Alternatively, the fourth message is used to notify the second network device that the first network device configures the CLI measurement for a terminal device. Alternatively, the fourth message is used to notify the second network device that the second network device is prohibited from configuring the CLI measurement for the terminal device.

Step 702: The first network device configures the CLI measurement for the terminal device.

Herein, the first network device may configure, for the terminal device, configuration information of a measurement object of the CLI measurement (for example, configuration information of a resource of the CLI measurement), reporting configuration information of the CLI measurement, and configuration information (namely, filtering configuration) of a measurement quantity for the CLI measurement.

Step 703: After ending the configured CLI measurement, the first network device sends a fifth message to the second network device. Correspondingly, the second network device receives the fifth message from the first network device.

Herein, the fifth message is used to indicate that the first network device ends the configured CLI measurement, or it may be understood as that the fifth message is used to notify the second network device that no CLI measurement is currently configured for the terminal device. It should be understood that, that the first network device ends the configured CLI measurement means that the first network device removes the CLI measurement configured for the terminal device.

In a possible implementation, after receiving the fourth message, the second network device may determine that the first network device configures the CLI measurement for the terminal device. In this case, the second network device does not configure the CLI measurement for the terminal device. After receiving the fifth message, the second network device may determine that the first network device ends the configured CLI measurement. In this case, the second network device may configure the CLI measurement for the terminal device.

It can be learned from step 701 and step 703 that, the first network device sends the fourth message to the second network device, so that that only one network device configures the CLI measurement for the terminal device can be implemented. In other words, based on this solution, the terminal device receives the CLI measurement configured by the only one network device for the terminal device. In this way, this helps avoid a case in which when the first network device and the second network device configure the CLI measurement for the terminal device, a limit of CLI measurement that the terminal device needs to perform is exceeded, so that the terminal device can still normally perform the CLI measurement in a scenario in which the terminal device is connected to the first network device and the second network device at the same time. Further, in this solution, the CLI measurement does not need to be negotiated between the first network device and the second network device, thereby helping reduce interaction between the first network device and the second network device.

Figure 8:
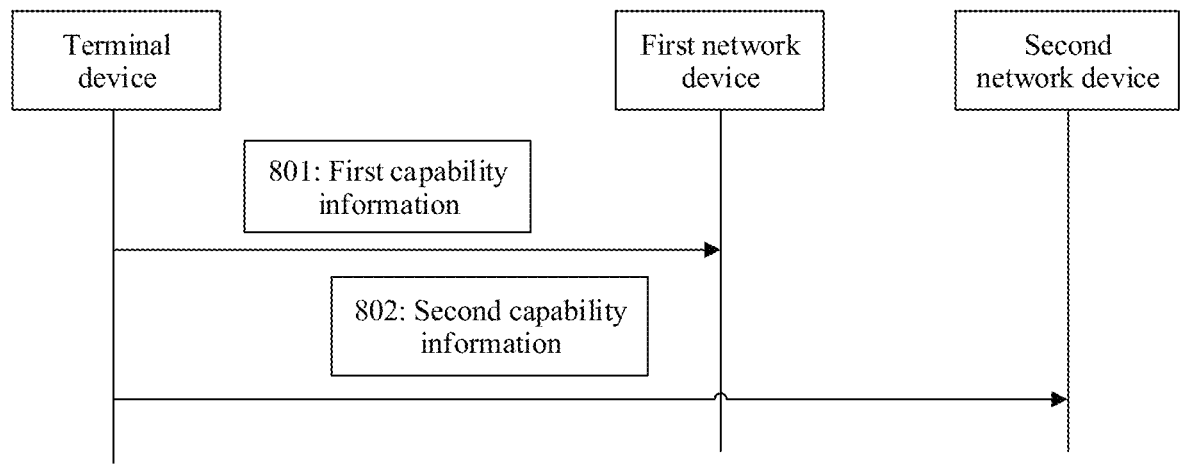
FIG. 8 is a schematic flowchart of yet another method for configuring CLI measurement according to this application.

In this application, the terminal device may report capability information of the terminal device to a network device. When one terminal device is connected to two network devices, the terminal device may properly plan capability information reported for the first network device and the second network device, so that CLI measurement configured by the first network device and the second network device for the terminal device does not exceed a total capability of the terminal device. FIG. 8 is a schematic flowchart of yet another method for configuring CLI measurement according to this application. The method includes the following steps.

Step 801: A terminal device sends first capability information to a first network device, where the first capability information is determined by the terminal device for the first network device. Correspondingly, the first network device receives the first capability information from the terminal device.

Step 802: The terminal device sends second capability information to a second network device, where the second capability information is determined by the terminal device for the second network device. Correspondingly, the second network device receives the second capability information from the terminal device.

Herein, a sum of the first capability information and the second capability information does not exceed total capability information supported by the terminal device.

Based on this solution, the first network device may configure CLI measurement for the terminal device based on the first capability information. The second network device may configure CLI measurement for the terminal device based on the second capability information. For example, the first network device and the second network device may separately configure a quantity of resources of the CLI measurement for the terminal device, or separately configure configuration information of the CLI measurement for the terminal device.

In a possible implementation, the first capability information includes a first quantity, determined for the first network device, of resources of the CLI measurement, and the second capability information includes a second quantity, determined for the second network device, of resources of the CLI measurement. A sum of the first quantity and the second quantity is less than or equal to a maximum quantity, supported by the terminal device, of resources of the CLI measurement.

For example, the first capability information includes a first quantity, supported by the terminal device, of CLI SRS resources, and the second capability information includes a second quantity, supported by the terminal device, of CLI SRS resources. Alternatively, the first capability information includes a first quantity, supported by the terminal device, of CLI RSSI resources, and the second capability information includes a second quantity, supported by the terminal device, of CLI RSSI resources.

With reference to FIG. 3, first capability information reported by the terminal device to an MN is a first quantity K1, supported by the terminal device, of CLI SRS resources, second capability information reported by the terminal device to an SN is a second quantity K2, supported by the terminal device, of CLI SRS resources, and a total quantity, supported by the terminal device, of CLI SRS resources is K, where $K1+K2 \leq K$.

Alternatively, first capability information reported by the terminal device to an MN is a first quantity L1, supported by the terminal device, of CLI RSSI resources, second capability information reported by the terminal device to an SN is a second quantity L2, supported by the terminal device, of CLI RSSI resources, and a total quantity, supported by the terminal device, of CLI RSSI resources is L, where $L1+L2 \leq L$.

In another possible implementation, the first capability information includes a third quantity, determined for the first network device, of resources of the CLI measurement in each unit time, and the second capability information includes a fourth quantity, determined for the second network device, of resources of the CLI measurement in each unit time. A sum of the third quantity and the fourth quantity is less than or equal to a maximum quantity, supported by the terminal device, of resources of the CLI measurement in each unit time.

For example, the first capability information includes a third quantity, supported by the terminal device, of CLI SRS resources in each unit time, and the second capability information includes a fourth quantity, supported by the terminal device, of CLI SRS resources in each unit time. Alternatively, the first capability information includes a third quantity, supported by the terminal device, of CLI RSSI resources in each unit time, and the second capability information includes a fourth quantity, supported by the terminal device, of CLI RSSI resources in each unit time.

With reference to FIG. 3, first capability information reported by the terminal device to an MN is a third quantity M1, supported by the terminal device, of CLI SRS resources in each unit time, second capability information reported by the terminal device to an SN is a fourth quantity M2, supported by the terminal device, of CLI SRS resources in each unit time, and a total quantity, supported by the terminal device, of CLI SRS resources in each unit time is M, where M1+M2≤M.

Alternatively, first capability information reported by the terminal device to an MN is a first quantity N1, supported by the terminal device, of CLI RSSI resources in each unit time, second capability information reported by the terminal device to an SN is a second quantity N2, supported by the terminal device, of CLI RSSI resources in each unit time, and a total quantity, supported by the terminal device, of CLI RSSI resources is N, where N1+N2≤N.

It should be noted that there is no sequence between step 801 and step 802, and step 801 may be performed before step 802. Alternatively, step 802 may be performed before step 801. Alternatively, step 801 and step 802 may be performed at the same time.

It can be learned from step 801 and step 802 that the terminal device properly allocates capability information to the first network device and the second network device based on the supported total capability information, and the sum of the first capability information and the second capability information does not exceed the total capability information supported by the terminal device. In this way, the CLI measurement that is configured by the first network device for the terminal device based on the first capability information and the CLI measurement that is configured by the second network device for the terminal device based on the second capability information do not exceed the total capability information supported by the terminal device. Therefore, the terminal device can still normally perform the CLI measurement in a scenario in which the terminal device is connected to the first network device and the second network device at the same time. Further, in this solution, the CLI measurement does not need to be negotiated between the first network device and the second network device, thereby helping reduce interaction between the first network device and the second network device.

In this application, a resource of the CLI measurement includes an SRS resource of the CLI measurement or an RSSI resource of the CLI measurement.

It should be noted that content indicated by using each of the first message, the second message, the third message, the fourth message, and the fifth message in this application may be agreed on by the first network device and the second network device in advance, or may be predefined in a protocol. This is not limited in this application. Herein, these messages each may be identified by using one index, or may be identified by using information having one or more bits, or may be identified in any other possible forms. This is not limited in this application. In addition, content indicated by using each of the first message, the second message, the third message, the fourth message, and the fifth message may alternatively be indicated by using a field in the message.

It may be understood that, to implement the functions in the foregoing embodiments, the network device includes a corresponding hardware structure and/or software module for performing each function. A person skilled in the art should easily be aware that, in combination with the examples described in the embodiments disclosed in this application, units and method steps may be implemented by hardware or a combination of hardware and computer software in this application. Whether a function is performed by hardware or hardware driven by computer software depends on particular application scenarios and design constraints of the technical solutions.

Figure 9:
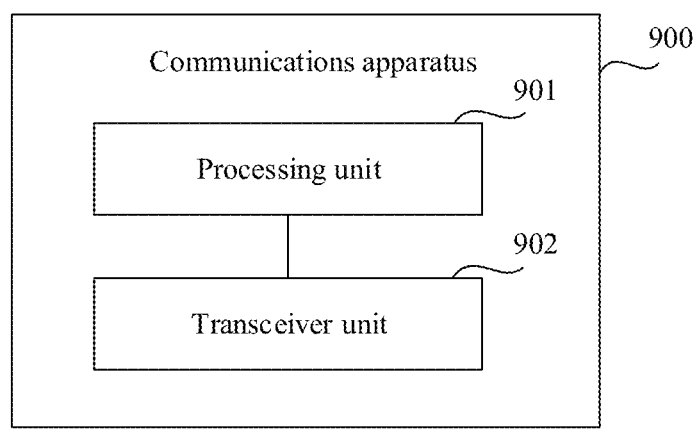
FIG. 9 is a schematic structural diagram of a communications apparatus according to this application.
Figure 10:
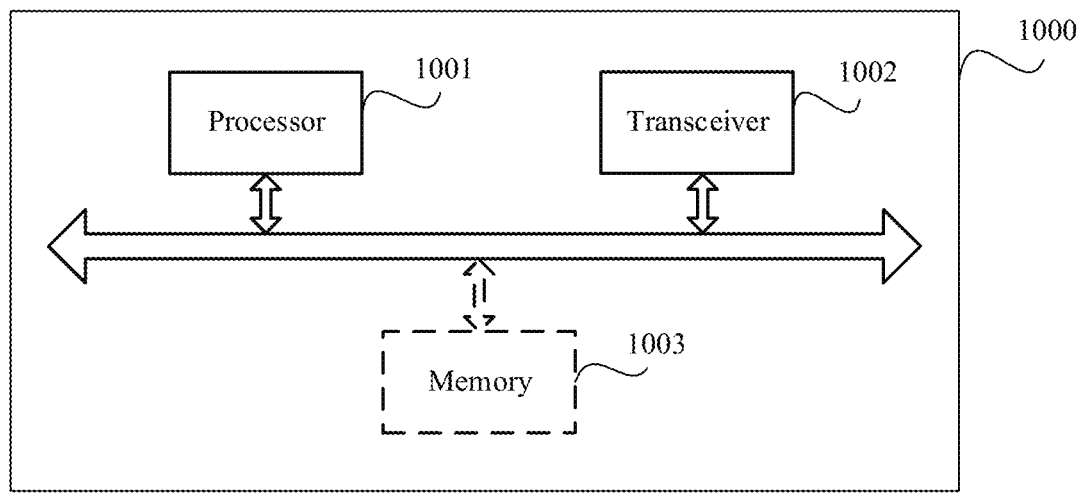
FIG. 10 is a schematic structural diagram of a communications apparatus according to this application.

FIG. 9 and FIG. 10 each are a schematic structural diagram of a possible communications apparatus according to this application. These communications apparatuses may be configured to implement a function of the first network device, the second network device, or the terminal device in the foregoing method embodiments, and therefore can also achieve beneficial effects of the foregoing method embodiments. In this application, the communications apparatus may be the network device 201 shown in FIG. 2, or may be a module (for example, a chip) used in the network device, or may be the terminal device 202 shown in FIG. 2.

As shown in FIG. 9, the communications apparatus 900 includes a processing unit 901 and a transceiver unit 902. The communications apparatus 900 is configured to implement a function of the first network device or the second network device in the method embodiment shown in FIG. 5, FIG. 6, FIG. 7, or FIG. 8.

When the communications apparatus 900 is configured to implement a function of the first network device in the method embodiment shown in FIG. 5, the transceiver unit 902 is configured to receive a first message from the second network device, where the first message is used to indicate information about cross-link interference CLI measurement; and the processing unit 901 is configured to configure the CLI measurement for the terminal device based on the first message.

When the communications apparatus 900 is configured to implement a function of the second network device in the method embodiment shown in FIG. 5, the processing unit 901 is configured to determine a first message, where the first message is used to indicate information about cross-link interference CLI measurement; and the transceiver unit 902 is configured to send the first message to the first network device.

For more detailed descriptions of the processing unit 901 and the transceiver unit 902, directly refer to the related descriptions in the method embodiment shown in FIG. 5, and details are not described herein again.

When the communications apparatus 900 is configured to implement a function of the terminal device in the method embodiment shown in FIG. 8, the transceiver unit 902 is configured to: send first capability information to the first network device, and send second capability information to the second network device, where the first capability information is determined by the processing unit 901 for the first network device, and the second capability information is determined by the processing unit 901 for the second network device.

For more detailed descriptions of the processing unit 901 and the transceiver unit 902, directly refer to the related descriptions in the method embodiment shown in FIG. 5, and details are not described herein again.

It should be understood that the processing unit 901 in this embodiment of this application may be implemented by a processor or a processor-related circuit component, and the transceiver unit 902 may be implemented by a transceiver or a transceiver-related circuit component.

Based on the foregoing content and a same concept, as shown in FIG. 10, this application further provides a communications apparatus 1000. The communications apparatus 1000 may include a processor 1001 and a transceiver 1002. The processor 1001 and the transceiver 1002 are coupled to each other. It may be understood that the transceiver 1002 may be an interface circuit or an input/output interface. Optionally, the communications apparatus 1000 may further include a memory 1003, configured to: store an instruction executed by the processor 1001, or store input data required by the processor 1001 to run an instruction, or store data generated after the processor 1001 runs an instruction.

When the communications apparatus 1000 is configured to implement the method shown in FIG. 5, the processor 1001 is configured to perform a function of the processing unit 901, and the transceiver 1002 is configured to perform a function of the transceiver unit 902.

When the communications apparatus is a chip used in a first network device, the chip of the first network device implements a function of the first network device in the foregoing method embodiment. The chip of the first network device receives a message from another module (for example, a radio frequency module or an antenna) in the first network device, and the message is sent by a second network device to the first network device. Alternatively, the chip of the first network device sends a message to another module (for example, a radio frequency module or an antenna) in the first network device, and the message is sent by the first network device to a second network device.

When the communications apparatus is a chip used in a second network device, the chip of the second network device implements a function of the second network device in the foregoing method embodiment. The chip of the second network device receives a message from another module (for example, a radio frequency module or an antenna) in the second network device, and the message is sent by a first network device to the second network device. Alternatively, the chip of the second network device sends a message to another module (for example, a radio frequency module or an antenna) in the second network device, and the message is sent by the second network device to a first network device.

Figure 11:
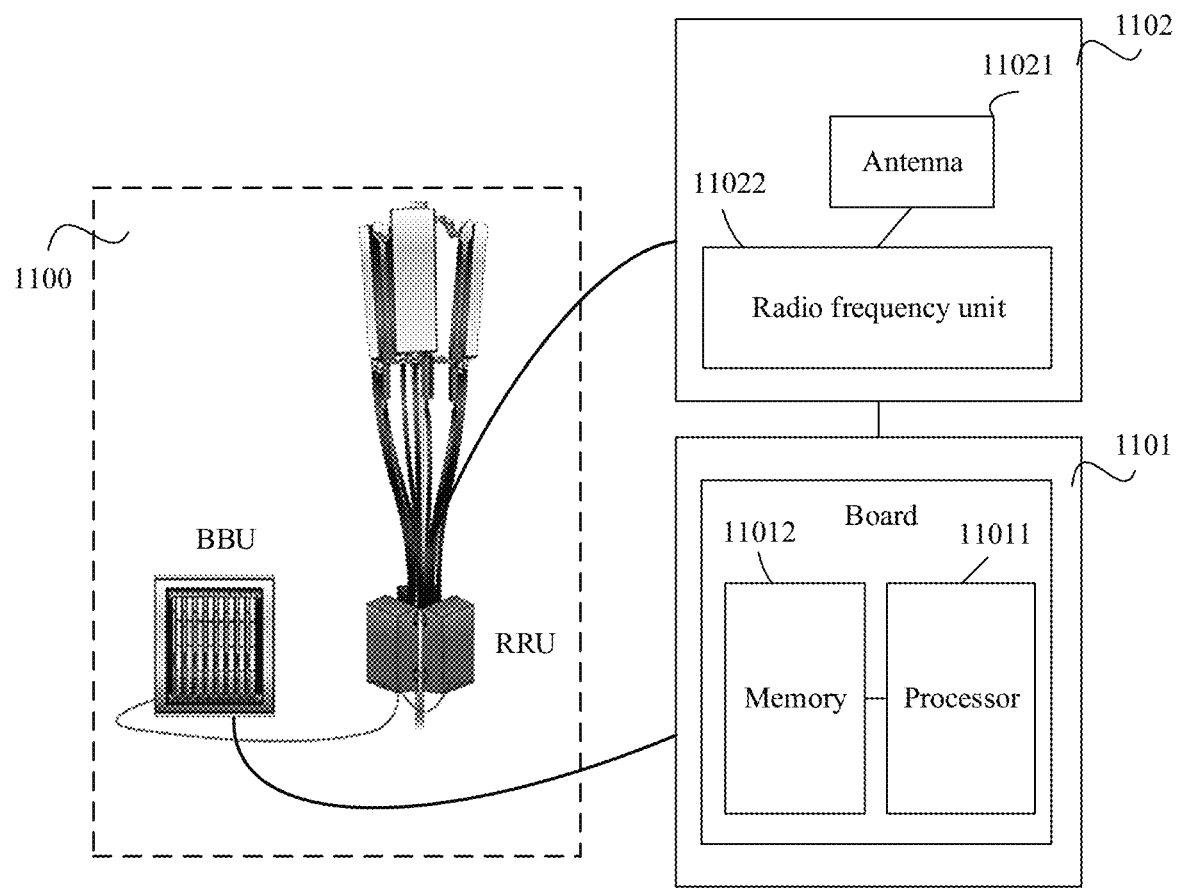
FIG. 11 is a schematic structural diagram of a network device according to this application.

When the communications apparatus is a network device, FIG. 11 is an example of a schematic structural diagram of a network device 1100 according to this application. As shown in FIG. 11, the network device 1100 may include one or more radio frequency units, for example, a remote radio unit (RRU) 1102 and one or more baseband units (BBU) 1101. The RRU 1102 may be referred to as a transceiver unit, a transceiver, a transceiver circuit, a transceiver, or the like, and may include at least one antenna 11021 and a radio frequency unit 11022. The RRU 1102 is mainly configured to: send and receive a radio frequency signal and perform conversion between a radio frequency signal and a baseband signal. The BBU 1101 may be referred to as a processing unit, a processor, or the like, is mainly configured to perform baseband processing, for example, channel coding, multiplexing, modulation, and frequency spread, and is also configured to control the network device, and so on. The RRU 1102 and the BBU 1101 may be physically disposed together, or may be physically separated, that is, in a distributed network device.

The BBU 1101 is a control center of the base station, and may also be referred to as a processing module. The BBU 1101 may correspond to the processing module 901 in FIG. 9, and is mainly configured to implement a baseband processing function, for example, channel coding, multiplexing, modulation, and frequency spread. For example, the BBU 1101 (the processing module) may be configured to control the base station to perform an operation procedure related to the network device in the foregoing method embodiment, for example, configure CLI measurement for a terminal device.

In an optional implementation, the BBU 1101 may include one or more boards, and a plurality of boards may jointly support a radio access network (for example, an LTE network) having a single access standard, or may separately support radio access networks (for example, an LTE network, a 5G network, or another network) having different access standards. The BBU 1101 further includes a memory 11012 and a processor 11011. The memory 11012 is configured to store necessary instructions and data. The processor 11011 is configured to control the network device to perform a necessary action, for example, configured to control the network device to perform the method performed by the network device in any one of the foregoing embodiments. The memory 11012 and the processor 11011 may serve the one or more boards. In other words, a memory and a processor may be separately disposed on each board. Alternatively, the plurality of boards may share a same memory and a same processor. In addition, a necessary circuit is further disposed on each board.

On an uplink, an uplink signal (including data and the like) sent by the terminal device is received through the antenna 11021, and on a downlink, a downlink signal (including data and/or control information) is sent to the terminal device through the antenna 11021. The processor 11011 processes service data and a signaling message based on a radio access technology (for example, an access technology in LTE, NR, and another evolved system) used for a radio access network. The processor 11011 is further configured to: control and manage an action of the network device, and perform processing performed by the network device in the foregoing embodiments. The processor 11011 is further configured to support a first network device in performing the method performed by the first network device in FIG. 5, or is further configured to support a second network device in performing the method performed by the second network device in FIG. 5.

It should be noted that FIG. 11 shows only a simplified design of the network device. In actual application, the network device may include any quantity of antennas, memories, processors, radio frequency units, RRUs, BBUs, and the like, and all network devices that can implement this application fall within the protection scope of this application.

It should be understood that the transceiver unit 1102 is configured to perform a sending operation and a receiving operation on a first network device side in the method embodiment shown in FIG. 5, and the processing unit 1101 is configured to perform an operation other than the receiving/sending operation on the first network device side in the method embodiment shown in FIG. 5. For example, the transceiver unit 1102 is configured to perform a receiving/sending operation on the first network device side in the embodiment shown in FIG. 5, for example, step 501. The processing unit 1101 is configured to perform the operation other than the receiving/sending operation on the first network device side in the embodiment shown in FIG. 5, for example, step 502.

This application further provides a communications apparatus, and the communications apparatus may be a terminal device or a circuit. The communications apparatus may be configured to perform an action performed by the terminal device in the foregoing method embodiments.

Figure 12:
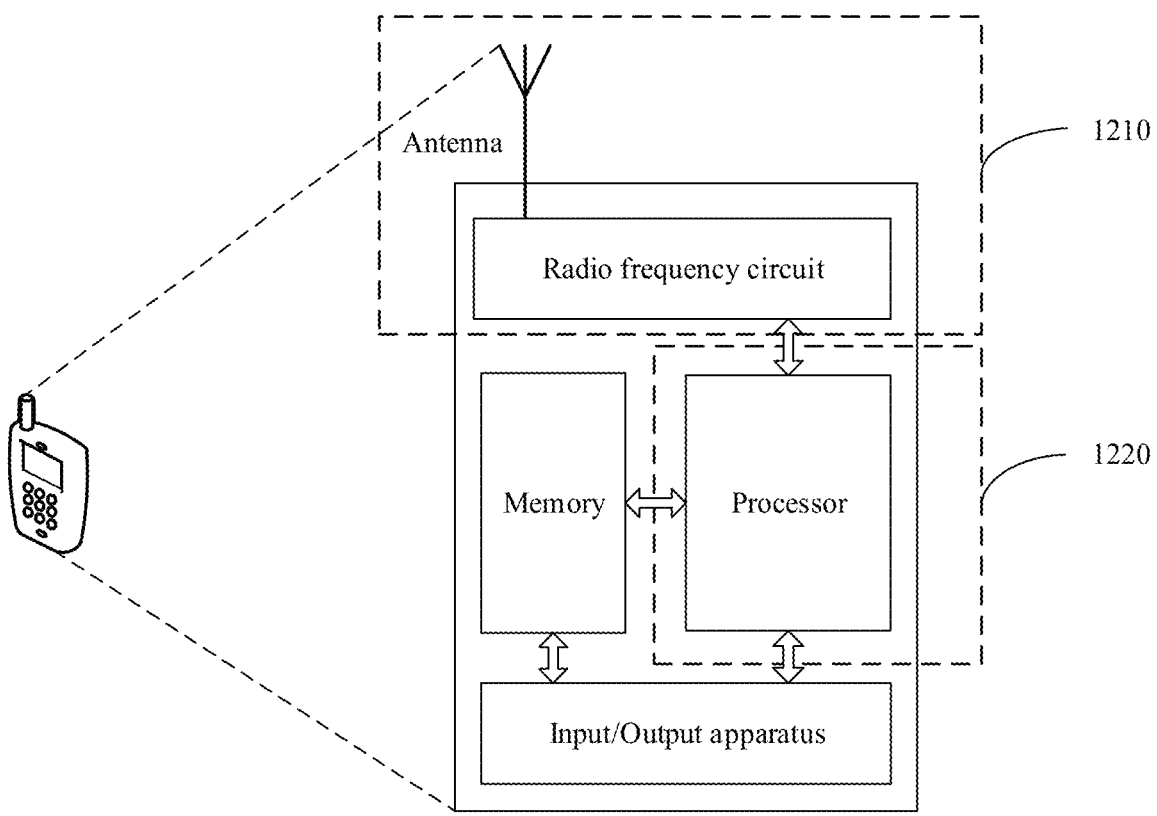
FIG. 12 is a schematic structural diagram of a terminal device according to this application.

When the communications apparatus is a terminal device, FIG. 12 is a simplified schematic structural diagram of the terminal device. For ease of understanding and illustration, an example in which the terminal device is a mobile phone is used in FIG. 12. As shown in FIG. 12, the terminal device includes a processor, a memory, a radio frequency circuit, an antenna, and an input/output apparatus. The processor is mainly configured to: process a communications protocol and communications data, control the terminal device, execute a software program, process data of the software program, and so on. The memory is mainly configured to store a software program and data. The radio frequency circuit is mainly configured to: perform conversion between a baseband signal and a radio frequency signal, and process the radio frequency signal. The antenna is mainly configured to send and receive a radio frequency signal in a form of an electromagnetic wave. The input/output apparatus, such as a touchscreen, a display screen, or a keyboard, is mainly configured to: receive data input by a user and output data to the user. It should be noted that some types of terminal devices may have no input/output apparatus.

When data needs to be sent, after performing baseband processing on the to-be-sent data, the processor outputs a baseband signal to the radio frequency circuit; and the radio frequency circuit performs radio frequency processing on the baseband signal and then sends a radio frequency signal to the outside in a form of an electromagnetic wave through the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 12 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In this application, the antenna and the radio frequency circuit that have receiving and sending functions may be considered as a transceiver unit of the terminal device, and the processor having a processing function may be considered as a processing unit of the terminal device. As shown in FIG. 12, the terminal device includes a transceiver unit 1210 and a processing unit 1220. The transceiver unit 1210 may also be referred to as a transceiver, a transceiver apparatus, or the like. The processing unit 1220 may also be referred to as a processor, a processing board, a processing module, a processing apparatus, or the like. Optionally, a component for implementing a receiving function in the transceiver unit 1210 may be considered as a receiving unit, and a component for implementing a sending function in the transceiver unit 1210 may be considered as a sending unit. That is, the transceiver unit 1210 includes the receiving unit and the sending unit. The transceiver unit 1210 may also be sometimes referred to as a transceiver, a transceiver circuit, or the like. The receiving unit may also be sometimes referred to as a receiver, a receiving circuit, or the like. The sending unit may also be sometimes referred to as a transmitter, a transmitting circuit, or the like.

It should be understood that the transceiver unit 1210 is configured to perform a sending operation and a receiving operation on a terminal device side in the foregoing method embodiments, and the processing unit 1220 is configured to perform an operation other than the receiving/sending operation of the terminal device in the foregoing method embodiments.

For example, in an implementation, the transceiver unit 1210 is configured to perform a sending operation on a terminal device side in step 801 and step 802 in FIG. 8, and/or the transceiver unit 1210 is further configured to perform another receiving/sending operation on the terminal device side in this application. The processing unit 1220 is configured to determine first capability information for a first network device and determine second capability information for a second network device in FIG. 8, and/or the processing unit 1220 is further configured to perform another processing step on the terminal device side in this application.

It may be understood that the processor in this application may be a central processing unit (CPU), may be another general-purpose processor, a digital signal processor (DSP), an application specific integrated circuit (ASIC), a field programmable gate array (FPGA), or another programmable logic device, a transistor logic device, a hardware component, or any combination thereof. The general-purpose processor may be a microprocessor or any conventional processor.

The method steps in the embodiments of this application may be implemented in a hardware manner or may be implemented in a manner of executing a software instruction by a processor. The software instruction may include a corresponding software module. The software module may be stored in a random access memory (RAM), a flash memory, a read-only memory (ROM), a programmable read-only memory (Programmable ROM, PROM), an erasable programmable read-only memory (Erasable Programmable ROM, EPROM), an electrically erasable programmable read-only memory (Electrically EPROM, EEPROM), a register, a hard disk, a mobile hard disk, a CD-ROM, or any other form of storage medium well-known in the art. For example, a storage medium is coupled to a processor, so that the processor can read information from the storage medium or write information into the storage medium. Certainly, the storage medium may alternatively be a component of the processor. The processor and the storage medium may be located in an ASIC. In addition, the ASIC may be located in a network device or a terminal device. Certainly, the processor and the storage medium may alternatively exist in the network device or the terminal device as discrete assemblies.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer programs or instructions. When the computer programs or the instructions are loaded and executed on a computer, the procedures or functions in the embodiments of this application are all or partially performed. The computer may be a general-purpose computer, a dedicated computer, a computer network, a network device, a user device, or another programmable apparatus. The computer programs or the instructions may be stored in a computer-readable storage medium or may be transmitted from a computer-readable storage medium to another computer-readable storage medium. For example, the computer programs or the instructions may be transmitted from a website, computer, server, or data center to another website, computer, server, or data center in a wired or wireless manner. The computer-readable storage medium may be any usable medium accessible by a computer, or a data storage device, such as a server or a data center, integrating one or more usable media. The usable medium may be a magnetic medium such as a floppy disk, a hard disk, or a magnetic tape, may be an optical medium such as a digital video disc (DVD), or may be a semiconductor medium such as a solid-state drive (SSD).

In the embodiments of this application, unless otherwise stated or there is a logical conflict, terms and/or descriptions between different embodiments are consistent and may be mutually referenced, and technical features in different embodiments may be combined according to an internal logical relationship thereof, to form a new embodiment.

"A plurality of" in this application refers to two or more than two. The term "and/or" describes an association relationship between associated objects and indicates that three relationships may exist. For example, A and/or B may indicate the following three cases: Only A exists, both A and B exist, and only B exists. A and B may be in a singular or plural form. In the text description of this application, the character "/" indicates an "or" relationship between the associated objects. In a formula in this application, the character "/" indicates a "division" relationship between the associated objects.

It may be understood that numerical symbols used in the embodiments of this application are differentiated merely for ease of description, but are not used to limit the scope of the embodiments of this application. Sequence numbers of the foregoing processes do not mean execution sequences, and the execution sequences of the processes should be determined based on functions and internal logic of the processes.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located at one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the current technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for configuring cross-link interference (CLI) measurement, the method comprising:
    receiving, by a first network device, a first message from a second network device, wherein the first message indicates information about a cross-link interference (CLI) measurement, the information about the CLI measurement comprises a quantity of resources of the CLI measurement, and the first message indicates a maximum quantity of resources that are of the CLI measurement and that the first network device is allowed to configure for a terminal device; and
    configuring, by the first network device, the CLI measurement for the terminal device based on the first message.

2. The method according to claim 1, wherein the method further comprises:
    sending, by the first network device, a second message to the second network device in response to determining that the quantity, indicated by the first message, of resources of the CLI measurement does not meet a first threshold, wherein:
        the second message notifies the second network device to adjust the quantity of resources of the CLI measurement that are configured for the terminal device, or notifies the second network device to adjust the quantity of resources that are of the CLI measurement and that the first network device is allowed to configure for the terminal device.

3. The method according to claim 1, wherein:
    the information about the CLI measurement comprises configuration information of a resource of the CLI measurement; and the first message indicates configuration information of a resource that is of the CLI measurement and that the second network device plans to configure for the terminal device.

4. The method according to claim 3, wherein the method further comprises:
determining, by the first network device based on the first message and configuration information of a resource that is of the CLI measurement and that the first network device plans to configure for the terminal device, a total quantity of resources of the CLI measurement that are configured by the first network device and the second network device for the terminal device; and
adjusting, by the first network device, the configuration information of the resource that the first network device plans to configure for the terminal device in response to a determination that the total quantity is greater than a second threshold, wherein the second threshold is one of the following:
a maximum quantity of resources of the CLI measurement;
a maximum quantity, supported by the terminal device, of resources of the CLI measurement;
a maximum quantity of resources of the CLI measurement in each unit of time; or
a maximum quantity, supported by the terminal device, of resources of the CLI measurement in each unit of time.

5. The method according to claim 1, wherein:
the first message indicates one of the following:
configuring, by the second network device, the CLI measurement for the terminal device;
allowing the first network device to configure the CLI measurement for the terminal device; or
indicating the first network device to configure the CLI measurement for the terminal device; and
the method further comprises:
sending, by the first network device, a third message to the second network device, wherein the third message queries whether the first network device is allowed to configure the CLI measurement for the terminal device.

6. The method according to claim 1, wherein the resources comprise a sounding reference signal (SRS) resource or a received signal strength indicator (RSSI) resource.

7. A method for configuring cross-link interference (CLI) measurement, the method comprising:
determining, by a second network device, a first message, wherein the first message indicates information about a cross-link interference (CLI) measurement, the information about the CLI measurement comprises a quantity of resources of the CLI measurement, and the first message indicates a maximum quantity of resources that are of the CLI measurement and that a first network device is allowed to configure for a terminal device; and
sending, by the second network device, the first message to the first network device.

8. The method according to claim 7, wherein the method further comprises:
receiving, by the second network device, a second message from the first network device; and
adjusting, by the second network device based on the second message, the quantity of resources of the CLI measurement that are configured for the terminal device; or
adjusting, by the second network device based on the second message, the quantity of resources that are of the CLI measurement and that the first network device is allowed to configure for the terminal device.

9. The method according to claim 7, wherein:
the information about the CLI measurement comprises configuration information of a resource of the CLI measurement; and
the first message indicates configuration information of a resource that is of the CLI measurement and that the second network device plans to configure for a terminal device.

10. The method according to claim 7, wherein the method further comprises:
receiving, by the second network device, a third message from the first network device, wherein the third message queries whether the first network device is allowed to configure the CLI measurement for a terminal device.

11. The method according to claim 7, wherein the resources comprises a sounding reference signal (SRS) resource or a received signal strength indicator (RSSI) resource.

12. An apparatus, comprising:
at least one processor; and
one or more memories coupled to the at least one processor and storing program instructions for execution by the at least one processor to:
receive, by a first network device, a first message from a second network device, wherein the first message indicates information about a cross-link interference (CLI) measurement, the information about the CLI measurement comprises a quantity of resources of the CLI measurement, and the first message indicates a maximum quantity of resources that are of the CLI measurement and that the first network device is allowed to configure for a terminal device; and
configure, by the first network device, the CLI measurement for the terminal device based on the first message.

13. The apparatus according to claim 12, wherein the one or more memories store the program instructions for execution by the at least one processor to:
send, by the first network device, a second message to the second network device in response to determining that the quantity, indicated by the first message, of resources of the CLI measurement does not meet a first threshold, wherein:
the second message notifies the second network device to adjust the quantity of resources of the CLI measurement that are configured for the terminal device, or notifies the second network device to adjust the quantity of resources that are of the CLI measurement and that the first network device is allowed to configure for the terminal device.

14. The apparatus according to claim 12, wherein:
the information about the CLI measurement comprises configuration information of a resource of the CLI measurement; and
the first message indicates configuration information of a resource that is of the CLI measurement and that the second network device plans to configure for the terminal device.

15. The apparatus according to claim 14, wherein the one or more memories store the program instructions for execution by the at least one processor to:

determine, by the first network device based on the first message and configuration information of a resource that is of the CLI measurement and that the first network device plans to configure for the terminal device, a total quantity of resources of the CLI measurement that are configured by the first network device and the second network device for the terminal device; and adjusting, by the first network device, the configuration information of the resource that the first network device plans to configure for the terminal device in response to a determination that the total quantity is greater than a second threshold, wherein the second threshold is one of the following:
- a maximum quantity of resources of the CLI measurement;
- a maximum quantity, supported by the terminal device, of resources of the CLI measurement;
- a maximum quantity of resources of the CLI measurement in each unit of time; or
- a maximum quantity, supported by the terminal device, of resources of the CLI measurement in each unit of time.

16. The apparatus according to claim 12, wherein:

the first message indicates one of the following:
- configuring, by the second network device, the CLI measurement for the terminal device;
- allowing the first network device to configure the CLI measurement for the terminal device; or
- indicating the first network device to configure the CLI measurement for the terminal device; and the one or more memories store the program instructions for execution by the at least one processor to:
- send, by the first network device, a third message to the second network device, wherein the third message queries whether the first network device is allowed to configure the CLI measurement for the terminal device.

17. The apparatus according to claim 12, wherein the resources comprise a sounding reference signal (SRS) resource or a received signal strength indicator (RSSI) resource.

* * * * *